(12) United States Patent
Knapke et al.

(10) Patent No.: US 9,999,853 B2
(45) Date of Patent: Jun. 19, 2018

(54) PROCESSES FOR FILTERING CHEMICALS FROM AIR STREAMS

(71) Applicant: GUILD ASSOCIATES INC., Dublin, OH (US)

(72) Inventors: Michael J. Knapke, Plain City, OH (US); Joseph A. Rossin, Columbus, OH (US)

(73) Assignee: GUILD ASSOCIATES INC., Dublin, OH (US)

( * ) Notice: Subject to any disclaimer, the term of this patent is extended or adjusted under 35 U.S.C. 154(b) by 0 days. days.

(21) Appl. No.: 15/498,742

(22) Filed: Apr. 27, 2017

(65) Prior Publication Data

US 2017/0312685 A1    Nov. 2, 2017

Related U.S. Application Data

(60) Provisional application No. 62/330,363, filed on May 2, 2016.

(51) Int. Cl.

| | |
|---|---|
| *A61L 9/00* | (2006.01) |
| *B01D 46/00* | (2006.01) |
| *B01D 53/82* | (2006.01) |
| *B01D 53/04* | (2006.01) |
| *B01D 53/50* | (2006.01) |
| *B01D 53/52* | (2006.01) |
| *B01D 53/72* | (2006.01) |
| *B01D 53/54* | (2006.01) |
| *B01D 53/56* | (2006.01) |
| *B01D 53/58* | (2006.01) |
| *B01J 20/20* | (2006.01) |
| *B01J 20/06* | (2006.01) |
| *B01J 20/22* | (2006.01) |
| *B01J 20/02* | (2006.01) |
| *B01J 20/28* | (2006.01) |

(52) U.S. Cl.
CPC ......... *B01D 53/82* (2013.01); *B01D 46/0036* (2013.01); *B01D 53/04* (2013.01); *B01D 53/508* (2013.01); *B01D 53/52* (2013.01); *B01D 53/54* (2013.01); *B01D 53/565* (2013.01); *B01D 53/58* (2013.01); *B01D 53/72* (2013.01); *B01J 20/0244* (2013.01); *B01J 20/0288* (2013.01); *B01J 20/06* (2013.01); *B01J 20/20* (2013.01); *B01J 20/22* (2013.01); *B01J 20/28028* (2013.01); *B01J 20/28035* (2013.01); *B01D 2251/502* (2013.01); *B01D 2251/506* (2013.01); *B01D 2251/70* (2013.01); *B01D 2253/102* (2013.01); *B01D 2253/112* (2013.01); *B01D 2253/1122* (2013.01); *B01D 2253/20* (2013.01); *B01D 2253/25* (2013.01); *B01D 2257/302* (2013.01); *B01D 2257/304* (2013.01); *B01D 2257/404* (2013.01); *B01D 2257/406* (2013.01); *B01D 2257/408* (2013.01); *B01D 2257/556* (2013.01); *B01D 2257/708* (2013.01); *B01D 2259/401* (2013.01); *B01D 2259/4145* (2013.01)

(58) Field of Classification Search
CPC .. A61L 9/00; A61L 2209/00; A61L 2209/133; A61L 2209/14; A61L 2209/20; A61L 2209/21; A61L 2209/22; B01D 46/00; B01D 46/0019; B01D 46/0023; B01D 46/0024; B01D 46/0038; B01D 2221/16; B01D 2239/0464; B01D 2239/065; B01D 2258/06; B01D 2259/4508; B01D 2259/4558; B01D 2267/00; B01D 2279/65

See application file for complete search history.

(56) References Cited

U.S. PATENT DOCUMENTS

2015/0283493 A1* 10/2015 Billingsley ........ B01J 20/28052
128/205.29

\* cited by examiner

*Primary Examiner* — Timothy C Vanoy
(74) *Attorney, Agent, or Firm* — Slayden Grubert Beard PLLC

(57) ABSTRACT

The present invention provides processes for filtering undesired chemicals in streams of contaminated air for supply to confined areas. The processes provide (1) contacting air with a filter comprising by volume from about 5% to about 95% impregnated zirconium hydroxide, from about 5% to about 95% activated impregnated carbon, and optionally, up to about 50% ammonia removal material; and (2) supplying the contacted air to a confined area.

63 Claims, No Drawings

PROCESSES FOR FILTERING CHEMICALS FROM AIR STREAMS

RELATED PATENT APPLICATION

This application claims priority to commonly owned U.S. Provisional Patent Application No. 62/330,363; filed May 2, 2016; which is hereby incorporated by reference herein for all purposes.

FIELD OF THE INVENTIONS

The present invention relates to novel processes for removing toxic chemicals from streams of gas supplied to confined areas that offers enhanced chemical protection capability and improved filter life. The novel processes involve contacting a contaminated process stream with a filter comprised of at least one of the following: activated carbon or activated, impregnated carbon, and impregnated zirconium hydroxide. Optionally, an ammonia removal material may also be employed in the filter, preferably a filter bed. The dissimilar media in the filter, e.g., bed, may be layered or mixed. The novel processes provide enhanced chemical protection capability while also being resistant to degradation resulting from continuous or near continuous exposure to water vapor and contaminants, thereby providing extended filter service life. The present filters may be comprised of a packed bed of dissimilar media, or as media immobilized in polymeric webbing that may be subsequently molded into a desired form. Optionally, the present inventive filters may be integrated with a High Efficiency Particulate Adsorption (HEPA) filter to provide additional protection against particle and aerosol contaminants.

BACKGROUND OF THE INVENTIONS

Filters used to provide purified air to confined areas are referred to as collective protection (CP) filters. CP filters differ from respirator or cartridge filters in that CP filters are operated on a continuous or near continuous basis and are designed to protect personnel located in a confined area. Respirator filters are used in conjunction with a gas mask and are designed to be used only in the event of a chemical incident, or when a chemical threat is imminent. Because of the continuous or near continuous operation of the CP filter, unexpected deactivation of the filtration media is of concern.

Collective protection (CP) filters are designed to remove toxic chemicals, such as traditional chemical warfare (CW) agents and toxic industrial chemicals (TICs) from air, thereby providing safe breathing to personnel in a chemically contaminated environment. Collective protection filters are designed to treat large volumes of air entering rooms, shelters, buildings, vehicles, etc. The volumes of air treated by CP filters varies, e.g., from about 50 standard cubic feet per minute (SCFM) to greater than about 1,000 SCFM, and in some cases, greater than about 10,000 SCFM.

For purposes of this application, a toxic chemical is defined as any chemical present in the vapor phase that may cause harm to a human. CW agents and TICs are examples of toxic chemicals. Examples of traditional chemical warfare agents include hydrogen cyanide (HCN, also known as AC), chlorine gas ($Cl_2$), phosgene ($COCl_2$, also known as CG), cyanogen chloride (ClCN, also known as CK), mustard (bis(2-chloroethyl) sulfide, also known as HD), sarin ((RS)-Propan-2-yl methylphosphono-fluoridate, also known as GB) and O-ethyl S-[2-(diisopropylamino)ethyl] methylphosphonothioate (also known as VX). Further examples of traditional CW agents are provided in Army Field Manual 3-9 which is hereby incorporated herein by reference. Toxic Industrial Chemicals may be defined as chemicals with an $LCt_{50}$ of less than about 100,000 mg-min/m$^3$ and manufactured in quantities exceeding about 30 tons per year at a single facility. Examples of TICs include sulfur dioxide ($SO_2$), hydrogen sulfide ($H_2S$), chlorine gas ($Cl_2$), fuming nitric acid ($HNO_3$), nitrogen dioxide ($NO_2$), formaldehyde ($CH_2O$), ammonia ($NH_3$) and mixtures of two or more of the same.

Current CP filters designed to remove CW agents and TICs from air may contain activated, impregnated carbon. ASZM-T is one example of activated, impregnated carbon which comprises activated carbon onto which salts of copper, zinc, molybdenum and silver are loaded, along with triethylene diamine (TEDA). When freshly prepared, ASZM-T has a high capacity for the removal of CW agents and selected TICs; however, ASZM-T degrades as a result of prolonged exposure to humid air, and degrades even faster when exposed to humid air containing low levels of airborne contaminants, such as, e.g., $SO_x$, $NO_x$ and fuel vapors. Degradation of ASZM-T results in a decreased protection capability of the filter and costly filter change-outs.

Unlike individual protection filters (respirator cartridges), filters employed in collective protection applications are, as mentioned, in operation on a continuous or near continuous basis. As a result, these filters may be exposed to large volumes of humid air containing low concentrations of atmospheric contaminants. Examples of atmospheric contaminants include but are not limited to organic vapors (e.g., fuel vapors), $NO_x$ and $SO_x$; however, depending on the location of the CP filter, atmospheric contaminants may also include cleaning and degreasing solvents, engine exhaust, mercaptans and sulfides, etc. For example, a filter designed to treat 200 ft$^3$/min of air may process greater than about 100,000,000 ft$^3$ of air per year. Due to the large volume of air which passes through the CP filter, the exposure of airborne contaminants poses a significant degradation hazard to the overall service life of the filter. A CP filter's ability to remove traditional CW agents and TICs may be decreased upon contact with one or more airborne contaminants. The net effect of continuous or near continuous exposure of airborne contaminants to the CP filter media causes a degradation of the activated impregnated carbon media contained within the filter. Due to degradation resulting from continuous or near-continuous operation of the CP filter, the CP filter is often "overdesigned;" that is to say, the filter contains a greater than necessary volume of activated, impregnated carbon to take degradation into account.

While not meant to be limited thereby, it is believed there are two primary mechanisms by which airborne contaminants may adversely affect the ability of activated, impregnated carbon to provide chemical protection. First, a contaminant may react with the impregnants responsible for the removal of toxic chemicals via chemical reaction. Examples of airborne contaminants that may react with the impregnants may include but are not limited to acid gases, e.g., hydrochloric acid, nitric acid, chlorine gas, and sulfur dioxide, etc. Many of the chemical reactions promoted by activated, impregnated carbon are of the gas-solid type. For example, sulfur dioxide may be oxidized within the pores of carbon granules, leading to the formation of sulfur trioxide ($SO_3$). Sulfur trioxide may subsequently react with one or more base metal impregnants, for example, copper ammonium carbonate. Such a reaction with copper ammonium carbonate may lead to the formation of copper sulfate (CuSO$_4$). Copper sulfate is relatively ineffective in its ability to react with certain traditional CW agents, for example, hydrogen cyanide.

Secondly, low volatility airborne contaminants, such as, for example fuel vapors, may be physically adsorbed within the pores of activated, impregnated carbon, preventing access to impregnants located within the pore structure, minimizing the adsorption of persistent threat compounds (e.g., sarin, pesticides). Examples of airborne contaminants that may physically adsorb within the pores of carbon include oils, hydraulic fluids and insecticides. Examples of airborne contaminants that may polymerize within the pores of activated, impregnated carbon include acrolein, formaldehyde and ethylene glycol. In addition, exposure of a filter to moderate volatility airborne contaminants (e.g., fuel vapors) may adversely affect the ability of the filtration media to remove toxic chemicals, at least until sufficient time has elapsed for the adsorbed vapors to purge from the media. Furthermore, fuel vapors may degrade the performance of a CP filter by physically blocking the pores of activated, impregnated carbon. This physical blocking may prevent access of one or more of the CW agents and TICs to reactive impregnates located within the pores of the carbon granules. As a result of prolonged exposure to the ambient environment, the media in the collective protection filter may become contaminated. The contamination may reach a point where the filter may no longer be able to provide a threshold level of chemical protection against CW agents and TICs.

Activated, impregnated carbon may also be degraded by long term exposure to humid air. The impregnation complexes associated with activated, impregnated carbon are often times water soluble. Over time, said impregnants migrate from within the pores of the carbon granules to the external surfaces of the granules. Said migration leads to a loss of metal dispersion and subsequent degradation in filtration performance.

It is desired that collective protection filters be as resistant as possible to performance degradation resulting from exposure to humid air and atmospheric contaminants. In this manner, filters may remain in service for extended periods of time so that when needed, the filters may provide the necessary level of protection. In addition, increasing the durability of the filters may decrease costly replacement and disposal burdens.

SUMMARY OF THE INVENTIONS

The invention described herein relates to novel processes for removing chemicals, e.g., toxic chemicals such as traditional CW agents and TICs, from contaminated air. The processes employ a filter, preferably a layered bed filter, providing longer service life and enhanced chemical protection than achieved by a single activated, impregnated carbon filtration media, such as ASZM-T. The preferred layered bed filter of the present invention is preferably comprised of: activated carbon or activated, impregnated carbon, and impregnated zirconium hydroxide. Optionally, an ammonia removal material may also be employed as an additional layer in the bed. The dissimilar media in the bed may be layered or mixed; however, layering the media may be preferred to achieve optimal filtration performance. Optimal enhanced chemical protection may be achieved, according to one embodiment, by placing the impregnated zirconium hydroxide at the filter inlet, followed by the activated carbon and/or activated, impregnated carbon at the filter outlet. If desired, the ammonia removal material is optimally located behind the zirconium hydroxide layer.

According to one embodiment, the invention provides processes for filtering undesired chemicals in a stream of contaminated air for supply to a confined area, the processes comprising (1) contacting the air with a filter, the filter comprising by volume from about 5% to about 95% impregnated zirconium hydroxide, from about 5% to about 95% activated impregnated carbon, optionally, up to about 50% ammonia removal material; and (2) supplying the contacted air to the confined area. According to an embodiment the invention provides an impregnated zirconium hydroxide impregnated with one or more of Zn, Co, Ag and triethylene diamine. Preferably, the zirconium hydroxide is impregnated with about 17% Zn, and/or about 3% Co, and/or about 0.3% Ag and/or about 6% triethylene diamine by weight.

According to another embodiment, the invention provides a process for filtering undesired chemicals in a stream of contaminated air for supply to a confined area, the processes comprising (1) contacting the air with a filter, the filter comprising by volume from about 5% to about 95% impregnated zirconium hydroxide, from about 5% to about 95% activated impregnated carbon, optionally, up to about 50% ammonia removal material; and (2) supplying the contacted air to the confined area. According to an embodiment, the activated impregnated carbon is impregnated with one or more of Cu, ZN, Mo, Ag and triethylene diamine. Preferably, the activated carbon is impregnated with about 4% Cu, and/or about 4% Zn, and/or about 2% Mo, and/or about 0.05% Ag and/or about 3% triethylene diamine by weight.

According to yet another embodiment, the present invention provides processes for filtering undesired chemicals in a stream of contaminated humid air for supply to confined areas. The processes include contacting the air with a radial flow filter before supplying the air to a confined area wherein the radial flow filter includes up to about 50%, preferably up to 48% by volume impregnated zirconium hydroxide by weight. The zirconium hydroxide may be impregnated with zinc. Preferably, the zirconium hydroxide is impregnated with about 17% Zn, and/or about 3% Co, and/or about 0.3% Ag and/or about 6% triethylene diamine by weight. According to this embodiment, the filter may further comprise up to about 70%, preferably up to 67% by weight impregnated activated carbon. The activated carbon may be impregnated with zinc. Preferably, the activated carbon is impregnated with about 4% Zn, and/or about 4% Cu, and/or about 2% Mo, and/or about 0.05% Ag and/or about 3% triethylene diamine by weight. According some preferred embodiments, both the zirconium hydroxide and the activated carbon are immobilized in a polymeric webbing.

According to yet a further embodiment, the present invention provides processes for filtering undesired chemicals in a stream of contaminated humid air before being supplied to a confined area. The processes may include: (1) contacting the air with a layered filter bed having an inlet layer comprised of zirconium hydroxide impregnated with zinc, (2) contacting the air with a middle layer of the layered filter bed comprised of a substrate impregnated with an acid, (3) contacting the air with an outlet layer of the layered filter bed, the outlet layer comprised of activated carbon impregnated with triethylene diamine, and (4) supplying the contacted air to a confined area. Preferably, the filter bed is comprised of about 20% by volume inlet layer, about 20% by volume middle layer, and about 60% by volume outlet layer. Preferably, the zirconium hydroxide is impregnated with about 17% Zn, and/or about 3% Co, and/or about 0.3% Ag and/or about 6% triethylene diamine by weight. Preferably, the middle layer is comprised of a porous substrate impregnated with an acid, e.g., one or more of HCl, $H_2SO_4$, citric acid, and formic acid. In addition and preferably, the middle layer is comprised of a porous substrate made of one or more of activated carbon, aluminum oxide, aluminum hydroxide, titanium dioxide, zirconium oxide and zirconium hydroxide. Preferably, according to some embodiments, the activated carbon is impregnated with about 3% triethylene diamine, and/or about 4% Zn, and/or about 4% Cu, and/or about 2% Mo, and/or about 0.05% Ag by weight.

The filter media can be of any suitable geometric form, for example; beads, granules or pellets. The filtration media may be housed in a device that promotes contact between the media and ambient air stream. Examples of filter housings include packed bed, annular bed or immobilization of media in a polymeric webbing. If desired to immobilize media in a polymeric webbing, said webbing may then be formed into a filter to a suitable geometric form per application. Said geometric form includes a flat plate or pleated configuration for a linear flow application, or an annular bed design for radial flow applications.

DETAILED DESCRIPTION OF THE PREFERRED EMBODIMENTS OF THE INVENTIONS

The present invention relates to processes for removing traditional CW agents and TICs from streams of air that offers extended service life and enhanced chemical protection capabilities. As used herein, "activated carbon" is defined as a form of carbon processed in a manner as to have small pores that provide the surface area necessary for adsorption of chemical vapors. Activated carbon is also referred to as active carbon or activated charcoal. As used herein, "activated, impregnated carbon" is defined as activated carbon containing impregnants added for the purpose of promoting adsorption or chemical reaction. Examples of impregnants include but are not limited to oxides, hydroxides, carbonates, ammonium complexes, etc. of vanadium, chromium, manganese, iron, cobalt, nickel, copper, zinc, molybdenum, tungsten, silver and gold, and mixtures thereof. Impregnants are not limited to metal complexes but may also include pure metals, such as silver and gold, and organic complexes, such as diethylene triamine and triethylene diamine (TEDA). Organic impregnants may be combined with metal impregnants.

As used herein, "zirconium hydroxide" is defined as a two dimensional zirconium oxyhydroxide array comprised of bridging oxygen and terminal hydroxyl groups. As used herein, "impregnated zirconium hydroxide" is defined as zirconium hydroxide containing impregnants, e.g., added for the purpose of promoting adsorption or chemical reaction. Examples of impregnants include oxides, hydroxides, carbonates, ammonium complexes, etc. of vanadium, chromium, manganese, iron, cobalt, nickel, copper, zinc, molybdenum, tungsten, silver and gold, and mixtures thereof. Impregnants are not limited to metal complexes but may also include metals, such as silver and gold, and organic complexes, such as diethylene triamine and triethylene diamine (TEDA). Organic impregnants may be combined with metal impregnants.

As used herein, an "ammonia removal material" is defined as a filtration material that targets the removal of ammonia and other amines (e.g., monomethyl amine). One example of an ammonia removal material may include a porous substrate impregnated with acids (e.g., HCl, $H_2SO_4$, citric acid, and formic acid). Examples of porous substrates may include activated carbon, aluminum oxide, aluminum hydroxide (also referred to as pseudoboehmite), titanium dioxide, zirconium oxide and zirconium hydroxide. Another example of an ammonia removal material may include a porous substrate impregnated with chlorides, sulfates and/or nitrates of iron, zinc, copper, nickel, or mixtures thereof.

Conventional CP filters contain activated impregnated carbon, such as ASZM-T. While effective in its ability to remove traditional CW agents, these filters provide insufficient protection versus TICs, examples of which include fuming nitric acid, nitrogen dioxide, ammonia, formaldehyde and sulfur dioxide. Further, activated, impregnated carbon, such as ASZM-T, is known by one of ordinary skill in the art to deactivate during periods of exposure to humid air and is highly susceptible to deactivation from exposure to humid air containing airborne contaminants.

According to one embodiment, the layered bed filter configuration of the present invention, impregnated zirconium hydroxide is employed to provide enhanced chemical removal capability versus TICs that are not effectively removed by activated, impregnated carbon. According to another embodiment, impregnated zirconium hydroxide may be employed to enhance the durability (lifetime) of the filter bed. According to an embodiment, activated carbon and/or activated, impregnated carbon are employed to provide physical adsorption capacity (as would be required for the removal of persistent CW agents). Optionally, and according to a further embodiment, an ammonia removal material may be incorporated to provide amine (e.g., ammonia, methyl amine) removal capability.

Impregnated zirconium hydroxide may be significantly more durable than activated, impregnated carbon due to the material being prepared by precipitation, rather than by impregnation as per activated, impregnated carbon. As a result, the metal impregnants may not migrate from within the pores of the granules to the external surface during periods of prolonged humid exposure or when saturated with water. Consequently, the zirconium hydroxide-based filtration media may not lose filtration performance following saturation with water or following periods of humid exposure. Secondly, the zirconium hydroxide-based filtration media may have a significantly greater filtration capacity for acid gases than does activated, impregnated carbon. As a result, the zirconium hydroxide-based filtration media may have a significantly longer useful life-time when exposed to airborne contaminants, e.g., such as $SO_x$ and $NO_x$. Lastly, the impregnated zirconium hydroxide may be mesoporous, versus the microporous activated, impregnated carbon. Due to the mesoporous nature of the impregnated zirconium hydroxide, the material may not strongly adsorb organic vapors that may be strongly adsorbed and retained by activated, impregnated carbon. As a result, impregnated zirconium hydroxide may have a significantly longer useful life time when exposed to organic vapors present in the air, such as fuel vapors and solvents etc.

The novel processes involve contacting an ambient air stream with filtration media located within a filter, preferably a filter bed, whereby between about 10% and about 90% of the filter volume is occupied by the impregnated zirconium hydroxide. The remainder of the filter, e.g., bed, may be occupied by activated, impregnated carbon or not impregnated carbon, and/or mixtures thereof. Optionally, an ammonia removal media may also be included in the filter.

The contact time between the air stream and the media bed will depend upon the nature of the chemical challenge and ambient environment. The contact time can be as little as about 0.05 seconds and as equal to or greater than about 1 second. It is preferred that the contact time be less than about 0.3 seconds and more preferably less than about 0.2 seconds.

The filtration media may be of any suitable geometric form, such as for example beads, extrudates or granules. The filtration media may be contained in a device that may promote contact between the media and the air stream. The device may include a packed bed, an annular bed such as a radial flow configuration, or alternatively, the media may be immobilized in webbing, e.g., polymeric webbing. Should it be desired to immobilize the media in polymeric webbing, the webbing may be formed into a filter element of the desired geometric form. Said geometric form may include a flat plate, a pleated configuration, an annular bed (radial flow) design, or any desired form.

According to one embodiment, the layered bed filter configuration of the novel processes may take many forms. The form of the configuration may be dependent upon the target level of chemical protection, the desired filter life and the nature of the anticipated chemical exposure. Examples of some suitable configurations are presented below:

1. Activated carbon or activated, impregnated carbon, and/or mixtures thereof at the filter inlet (5-90% filter volume), followed by impregnated zirconium hydroxide (10-95% of filter volume), followed by ammonia removal material (0-50% filter volume) at the filter outlet.
2. Impregnated zirconium hydroxide at the filter inlet (10-95% of filter volume) followed by activated carbon or activated, impregnated carbon, and/or mixtures thereof, (5-90% filter volume), followed by ammonia removal material (0-50% filter volume) at the filter outlet.
3. Activated carbon or activated, impregnated carbon, and/or mixtures thereof at the filter inlet (5-90% filter volume), followed by ammonia removal material (0-50% of filter volume), followed by impregnated zirconium hydroxide at the filter outlet (10-95% of filter volume).
4. Impregnated zirconium hydroxide at the filter inlet (10-95% of filter volume), followed by ammonia removal material (0-50% filter volume), followed by activated carbon or activated, impregnated carbon, and/or mixtures thereof, (5-90% filter volume), at the filter outlet.
5. Ammonia removal material (0-50% filter volume) at the filter inlet followed by activated carbon or activated, impregnated carbon, and/or mixtures thereof, (5-90% filter volume), followed by impregnated zirconium hydroxide (10-95% of filter volume) at the filter outlet.
6. Ammonia removal material (0-50% filter volume) at the filter inlet, followed by impregnated zirconium hydroxide (10-95% of filter volume) followed by activated carbon or activated, impregnated carbon, and/or mixtures thereof, (5-90% filter volume) at the filter outlet.

The above filter configurations are provided to serve as a guide. Filter configurations comprised of alternating layers of media may also be employed.

According to one preferred embodiment, an impregnated zirconium hydroxide layer may be located at the inlet of the filter should $NO_2$ or fuming nitric acid protection be desired. This may be desirable because exposure of activated carbon or activated, impregnated carbon to $NO_2$ and/or fuming nitric acid may result in the formation of toxic NO, which may rapidly pass through the filter. According to anther embodiment, it may also be preferred that the ammonia removal media, if employed, be located after the impregnated zirconium hydroxide, e.g., impregnated zirconium hydroxide immobilized in webbing.

It may be desired to immobilize filtration media, such as those described herein, in polymeric webbing, which may be comprised of low-melt fibers, structural fibers, or mixtures thereof. The fibers may be comprised of polyesters, polyacetates, etc. whereby the fibers are heat treated to immobilize the webbing. Immobilizing the filtration media in webbing may allow for the manufacture of thin layers of media, greatly increasing the ease in which layered bed filter preparation. Media may be immobilized in webbing with layers less than about 2 mm thick.

EXAMPLES

Example 1: Performance of Activated, Impregnated Carbon—$SO_2$ (Comparative)

An activated carbon impregnated with 4% Cu, 4% Zn, 2% Mo, 0.05% Ag by weight and 3% triethylene diamine (TEDA) by weight was obtained from a commercial vendor as 12×30 mesh granules. The material is referred to as AIC-T. AIC-T was evaluated for its ability to remove $SO_2$ from streams of air. A bed of AIC-T was exposed to air at 15% relative humidity (RH) for 1 hour at a residence time of 0.21 seconds to equilibrate the media. Following equilibration, the AIC-T bed was exposed to a process stream comprised of 4,000 mg/m$^3$ $SO_2$ in 15% RH air at a residence time of 0.21 seconds. The $SO_2$ breakthrough time (to an effluent concentration of 9 mg/m$^3$ $SO_2$) was 19.5 minutes.

A bed of 12×30 mesh AIC-T was exposed to 150 mg/m$^3$ diesel fuel vapors in flowing 80% RH air at a residence time of 0.21 seconds for 9 hours. Upon completion of the exposure, the bed was exposed to air at 15% relative humidity (RH) for 3 hours at a residence time of 0.21 seconds to equilibrate the media. Following equilibration, the diesel-exposed AIC-T bed was exposed to a process stream comprised of 4,000 mg/m$^3$ $SO_2$ in 15% RH air at a residence time of 0.21 seconds. The $SO_2$ breakthrough time was 19.5 minutes. The diesel exposure was repeated as before using a fresh bed of AIC-T for contact times of 18, 27, 36 and 45 hours. Upon completion of each diesel exposure, the $SO_2$ breakthrough curve was again recorded. The table below reports the $SO_2$ breakthrough times as a function of the diesel exposure duration.

| Diesel Exposure Duration | $SO_2$ Breakthrough Time |
| --- | --- |
| Unexposed | 19.5 min |
| 9 hours | 19.5 min |
| 18 hours | 16.0 min |
| 27 hours | 14.0 min |
| 36 hours | 10.5 min |
| 45 hours | 9.0 min |

A bed of 12×30 mesh AIC-T was exposed to contaminated stream comprised of 150 mg/m$^3$ diesel fuel vapors, 20 ppm $NO_2$ and 10 ppm $SO_2$ in flowing 80% RH air at a residence time of 0.21 seconds for 9 hours. Upon completion of the exposure, the bed was exposed to air at 15% relative humidity (RH) for 3 hours at a residence time of 0.21 seconds to equilibrate the media. Following equilibration, the contaminant-exposed bed was exposed to a process stream comprised of 4,000 mg/m$^3$ $SO_2$ in 15% RH air at a residence time of 0.21 seconds. The $SO_2$ breakthrough time decreased to 16.5 minutes. The contaminant exposure was repeated as before using a fresh bed of AIC-T for contact times of 18, 27, 36 and 45 hours. Upon completion of each exposure, the $SO_2$ breakthrough curve was again recorded. The table below reports the $SO_2$ breakthrough times as a function of the exposure duration.

| Contaminant Exposure Duration | $SO_2$ Breakthrough Time |
|---|---|
| Unexposed | 19.5 min |
| 9 hours | 16.5 min |
| 18 hours | 11.0 min |
| 27 hours | 6.0 min |
| 36 hours | 3.0 min |
| 45 hours | 1.5 min |

Results demonstrate that while AIC-T is able to effectively filter $SO_2$, the $SO_2$ filtration capabilities will significantly degrade following exposure to airborne contaminants.

Example 2: Performance of Activated, Impregnated Carbon—$H_2S$ (Comparative)

An activated carbon impregnated with 4% Cu, 4% Zn, 2% Mo, 0.05% Ag by weight and 3% triethylene diamine (TEDA) by weight was obtained from a commercial vendor as 12×30 mesh granules. The material is referred to as AIC-T. AIC-T was evaluated for its ability to remove $H_2S$ from streams of air. A bed of AIC-T was exposed to air at 15% relative humidity (RH) for 1 hour at a residence time of 0.21 seconds to equilibrate the media. Following equilibration, the AIC-T bed was exposed to a process stream comprised of 4,000 mg/m³ $H_2S$ in 15% RH air at a residence time of 0.21 seconds. The $H_2S$ breakthrough time (to an effluent concentration of 7 mg/m³ $H_2S$) was 28.0 minutes.

A bed of 12×30 mesh AIC-T was exposed to 150 mg/m³ diesel fuel vapors in flowing, 80% RH air at a residence time of 0.21 seconds for 9 hours. Upon completion of the exposure, the bed was exposed to air at 15% relative humidity (RH) for 3 hour at a residence time of 0.21 seconds to equilibrate the media. Following equilibration, the diesel-exposed AIC-T bed was exposed to a process stream comprised of 4,000 mg/m³ $H_2S$ in 15% RH air at a residence time of 0.21 seconds. The $H_2S$ breakthrough time remained unaffected at 26.0 minutes. The diesel exposure was repeated as before using a fresh bed of AIC-T for contact times of 18, 27, 36 and 45 hours. Upon completion of each diesel exposure, the $SO_2$ breakthrough curve was again recorded. The table below reports the $H_2S$ breakthrough times as a function of the diesel exposure duration.

| Diesel Exposure Duration | $H_2S$ Breakthrough Time |
|---|---|
| Unexposed | 26.0 min |
| 9 hours | 26.0 min |
| 18 hours | 24.0 min |
| 27 hours | 22.0 min |
| 36 hours | 15.0 min |
| 45 hours | 12.0 min |

A bed of 12×30 mesh AIC-T was exposed to contaminated stream comprised of 150 mg/m³ diesel fuel vapors, 20 ppm $NO_2$ and 10 ppm $SO_2$ in flowing 80% RH air at a residence time of 0.21 seconds for 9 hours. Upon completion of the exposure, the bed was exposed to air at 15% relative humidity (RH) for 3 hours at a residence time of 0.21 seconds to equilibrate the media. Following equilibration, the contaminant-exposed AIC-T bed was exposed to a process stream comprised of 4,000 mg/m³ $H_2S$ in 15% RH air at a residence time of 0.21 seconds. The $H_2S$ breakthrough time decreased to 23.0 minutes. The exposure was repeated as before using a fresh bed of AIC-T for contact times of 18, 27, 36 and 45 hours. Upon completion of each exposure, the $H_2S$ breakthrough curve was again recorded. The table below reports the $H_2S$ breakthrough times as a function of the exposure duration.

| Contaminant Exposure Duration | $H_2S$ Breakthrough Time |
|---|---|
| Unexposed | 26.0 min |
| 9 hours | 23.0 min |
| 18 hours | 18.0 min |
| 27 hours | 11.0 min |
| 36 hours | 6.0 min |
| 45 hours | 3.0 min |

Results demonstrate that while AIC-T is able to effectively filter $H_2S$, the $H_2S$ filtration capabilities will significantly degrade following exposure to airborne contaminants.

Example 3: Performance of Activated, Impregnated Carbon—DMMP (comparative)

DMMP is used in filter testing to simulate nerve agent. The simulant DMMP is used because it is far less toxic than a nerve agent. An activated carbon impregnated with 4% Cu, 4% Zn, 2% Mo, 0.05% Ag by weight and 3% triethylene diamine (TEDA) by weight was obtained from a commercial vendor as 12×30 mesh granules. The material is referred to as AIC-T. AIC-T was evaluated for its ability to remove dimethyl methyl phosphonate (DMMP) from streams of air. A bed of AIC-T was exposed to air at 15% relative humidity (RH) for 1 hour at a residence time of 0.21 seconds to equilibrate the media. Following equilibration, the AIC-T bed was exposed to a process stream comprised of 3,000 mg/m³ DMMP in 15% RH air at a residence time of 0.21 seconds. The DMMP breakthrough time (to an effluent concentration of 0.25 mg/m³ DMMP) was 160 minutes.

A bed of 12×30 mesh AIC-T was exposed to 150 mg/m³ diesel fuel vapors in flowing, 80% RH air at a residence time of 0.21 seconds for 9 hours. Upon completion of the exposure, the bed was exposed to air at 15% relative humidity (RH) for 3 hours at a residence time of 0.21 seconds to equilibrate the media. Following equilibration, the diesel-exposed AIC-T bed was exposed to a process stream comprised of 3,000 mg/m³ DMMP in 15% RH air at a residence time of 0.21 seconds. The DMMP breakthrough time decreased to 125 minutes. The diesel exposure was repeated as before using a fresh bed of AIC-T for contact times of 18, 27, 36 and 45 hours. Upon completion of each diesel exposure, the DMMP breakthrough curve was again recorded. The table below reports the DMMP breakthrough times as a function of the diesel exposure duration.

| Diesel Exposure Duration | DMMP Breakthrough Time |
|---|---|
| Unexposed | 160 min |
| 9 hours | 125 min |
| 18 hours | 103 min |
| 27 hours | 60 min |
| 36 hours | 52 min |
| 45 hours | 34 min |

A bed of 12×30 mesh AIC-T was exposed to contaminated stream comprised of 150 mg/m³ diesel fuel vapors, 20 ppm $NO_2$ and 10 ppm $SO_2$ in flowing, 80% RH air at a residence time of 0.21 seconds for 9 hours. Upon completion of the exposure, the bed was exposed to air at 15% relative humidity (RH) for 3 hours at a residence time of 0.21 seconds to equilibrate the media. Following equilibration, the contaminant-exposed bed was exposed to a process stream comprised of 3,000 mg/m³ DMMP in 15% RH air at a residence time of 0.21 seconds. The DMMP breakthrough time decreased to 116 minutes. The diesel exposure was repeated as before using a fresh bed of AIC-T for contact times of 18, 27, 36 and 45 hours. Upon completion of each exposure, the DMMP breakthrough curve was again recorded. The table below reports the DMMP breakthrough times as a function of the exposure duration.

| Contaminant Exposure Duration | DMMP Breakthrough Time |
|---|---|
| Unexposed | 160 min |
| 9 hours | 116 min |
| 18 hours | 94 min |
| 27 hours | 63 min |
| 36 hours | 52 min |
| 45 hours | 32 min |

Results demonstrate that while AIC-T is able to effectively filter DMMP, the DMMP filtration capabilities will significantly degrade following exposure to airborne contaminants.

Example 4: Performance of Activated, Impregnated Carbon—HCN (comparative)

An activated carbon impregnated with 4% Cu, 4% Zn, 2% Mo, 0.05% Ag by weight and 3% triethylene diamine (TEDA) by weight was obtained from a commercial vendor as 12×30 mesh granules. The material is referred to as AIC-T. AIC-T was evaluated for its ability to remove hydrogen cyanide (HCN) from streams of air. A bed of AIC-T was exposed to air at 80% relative humidity (RH) for 1 hour at a residence time of 0.21 seconds to equilibrate the media. Following equilibration, the AIC-T bed was exposed to a process stream comprised of 4,000 mg/m³ HCN in 80% RH air at a residence time of 0.21 seconds. The breakthrough time (to an effluent concentration of 8 mg/m³ HCN or product cyanogen, $C_2N_2$) was 16.5 minutes, with breakthrough occurring as $C_2N_2$, followed by HCN shortly afterwards.

A bed of 12×30 mesh AIC-T was exposed to contaminated stream comprised of 150 mg/m³ diesel fuel vapors, 20 ppm $NO_2$ and 10 ppm $SO_2$ in flowing, 80% RH air at a residence time of 0.21 seconds for 45 hours. Upon completion of the exposure, the bed was exposed to air at 80% relative humidity (RH) for 3 hours at a residence time of 0.21 seconds to equilibrate the media. Following equilibration, the contaminant-exposed bed was exposed to a process stream comprised of 4,000 mg/m³ HCN in 80% RH air at a residence time of 0.21 seconds. The HCN breakthrough time decreased to less than 2 minutes.

Example 5: Performance of Activated, Impregnated Carbon—$NH_3$ (Comparative)

An activated carbon impregnated with 4% Cu, 4% Zn, 2% Mo, 0.05% Ag by weight and 3% triethylene diamine (TEDA) by weight was obtained from a commercial vendor as 12×30 mesh granules. The material is referred to as AIC-T. AIC-T was evaluated for its ability to remove ammonia ($NH_3$) from streams of air. A bed of AIC-T was exposed to air at 15% relative humidity (RH) for 1 hour at a residence time of 0.21 seconds to equilibrate the media. Following equilibration, the AIC-T bed was exposed to a process stream comprised of 1,000 mg/m³ $NH_3$ in 15% RH air at a residence time of 0.21 seconds. The $NH_3$ breakthrough time (to an effluent concentration of 35 mg/m³ $NH_3$) was 4 minutes.

Results demonstrate that AIC-T is unable to effectively filter $NH_3$.

Example 6: Performance of Activated, Impregnated Carbon—$NO_2$ (Comparative)

An activated carbon impregnated with 4% Cu, 4% Zn, 2% Mo, 0.05% Ag by weight and 3% triethylene diamine (TEDA) by weight was obtained from a commercial vendor as 12×30 mesh granules. The material is referred to as AIC-T. AIC-T was evaluated for its ability to remove nitrogen dioxide ($NO_2$) from streams of air. A bed of AIC-T was exposed to air at 15% relative humidity (RH) for 3 hours at a residence time of 0.21 seconds to equilibrate the media. Following equilibration, the AIC-T bed was exposed to a process stream comprised of 375 mg/m³ $NO_2$ in 15% RH air at a residence time of 0.21 seconds. Breakthrough occurred as NO, rather than $NO_2$. The NO breakthrough time (to an effluent concentration of 25 mg/m³ NO) was 2 minutes.

Results demonstrate that AIC-T is unable to effectively filter $NO_2$.

Example 7: Performance of Activated, Impregnated Carbon—$CH_2O$ (Comparative)

An activated carbon impregnated with 4% Cu, 4% Zn, 2% Mo, 0.05% Ag by weight and 3% triethylene diamine (TEDA) by weight was obtained from a commercial vendor as 12×30 mesh granules. The material is referred to as AIC-T. AIC-T was evaluated for its ability to remove formaldehyde ($CH_2O$) from streams of air. A bed of AIC-T was exposed to air at 15% relative humidity (RH) for 3 hours at a residence time of 0.21 seconds to equilibrate the media. Following equilibration, the AIC-T bed was exposed to a process stream comprised of 1,200 mg/m³ $CH_2O$ in 15% RH air at a residence time of 0.21 seconds. The $CH_2O$ breakthrough time (to an effluent concentration of 1.5 mg/m³) was 22 minutes.

Results demonstrate that AIC-T is marginal in its ability to filter formaldehyde.

Example 8: Performance of Layered Bed—$SO_2$

A layered bed comprised of 33% by volume 16×30 mesh Co-ZZAT (zirconium hydroxide loaded with 17% Zn, 3% Co, and 0.3% Ag by weight and impregnated with 6% TEDA by weight) and 67% by volume 12×30 mesh AIC-T was evaluated for its ability to remove $SO_2$. Co-ZZAT was located at the bed inlet, and AIC-T was located at the bed outlet. The layered bed was evaluated for its ability to remove $SO_2$ from streams of air. The bed was exposed to air at 15% relative humidity (RH) for 1 hour at a residence time of 0.16 seconds to equilibrate the media. Following equilibration, the bed was exposed to a process stream comprised of 4,000 mg/m³ $SO_2$ in 15% RH air at a residence time of 0.16 seconds. The $SO_2$ breakthrough time (to an effluent concentration of 9 mg/m³ $SO_2$) was 22.5 minutes.

The layered bed described above was exposed to 150 mg/m³ diesel fuel vapors in flowing 80% RH air at a residence time of 0.16 seconds for 9 hours. Upon completion of the exposure, the bed was exposed to air at 15% relative humidity (RH) for 3 hours at a residence time of 0.16 seconds to equilibrate the media within the bed. Following equilibration, the diesel-exposed bed was exposed to a process stream comprised of 4,000 mg/m³ $SO_2$ in 15% RH air at a residence time of 0.16 seconds. The $SO_2$ breakthrough time decreased to 20 minutes. The diesel exposure was repeated as before using a fresh layered bed for contact times of 18, 27, 36 and 45 hours. Upon completion of each diesel exposure, the $SO_2$ breakthrough curve was again recorded. The table below reports the $SO_2$ breakthrough times as a function of the diesel exposure duration. Results corresponding to a bed of AIC-T evaluated at a residence time of 0.21 seconds are shown for comparative purposes (from Example 1).

| Diesel Exposure Duration | $SO_2$ Breakthrough Time AIC-T Bed | $SO_2$ Breakthrough Time Layered Bed |
|---|---|---|
| Unexposed | 19.5 min | 22.5 min |
| 9 hours | 19.5 min | 20.0 min |
| 18 hours | 16.0 min | 19.0 min |
| 27 hours | 14.0 min | 17.5 min |
| 36 hours | 10.5 min | 15.5 min |
| 45 hours | 9.0 min | 15.0 min |

The layered bed described previously in this example was exposed to contaminated stream comprised of 150 mg/m³ diesel fuel vapors, 20 ppm $NO_2$ and 10 ppm $SO_2$ in flowing, 80% RH air at a residence time of 0.16 seconds for 9 hours. Upon completion of the exposure, the bed was exposed to air at 15% relative humidity (RH) for 3 hour at a residence time of 0.16 seconds to equilibrate the media. Following equilibration, the contaminant-exposed bed was exposed to a process stream comprised of 4,000 mg/m³ $SO_2$ in 15% RH air at a residence time of 0.16 seconds. The $SO_2$ breakthrough time decreased to 18.5 minutes. The exposure was repeated as before using a fresh bed for contact times of 18, 27, 36 and 45 hours. Upon completion of each exposure, the $SO_2$ breakthrough curve was again recorded. The table below reports the $SO_2$ breakthrough times as a function of the exposure duration. Results corresponding to a bed of AIC-T evaluated at a residence time of 0.21 seconds are shown for comparative purposes (from Example 1).

| Contaminant Exposure Duration | $SO_2$ Breakthrough Time AIC-T Bed | $SO_2$ Breakthrough Time Layered Bed |
|---|---|---|
| Unexposed | 19.5 min | 22.5 min |
| 9 hours | 16.5 min | 18.5 min |
| 18 hours | 11.0 min | 16.0 min |
| 27 hours | 6.0 min | 12.5 min |
| 36 hours | 3.0 min | 11.5 min |
| 45 hours | 1.5 min | 7.5 min |

Results demonstrate that despite the shorter residence time, the layered bed of the present example provides improved filtration performance following exposure to airborne contaminants.

Example 9: Performance of Layered Bed—$H_2S$

A layered bed comprised of 33% by volume 16×30 mesh Co-ZZAT (zirconium hydroxide loaded with 17% Zn, 3% Co, and 0.3% Ag by weight and impregnated with 6% TEDA by weight) and 67% by volume 12×30 mesh AIC-T was evaluated for its ability to remove $H_2S$. Co-ZZAT was located at the bed inlet, and AIC-T was located at the bed outlet. The layered bed was evaluated for its ability to remove $H_2S$ from streams of air. The bed was exposed to air at 15% relative humidity (RH) for 1 hour at a residence time of 0.16 seconds to equilibrate the media. Following equilibration, the bed was exposed to a process stream comprised of 4,000 mg/m³ $H_2S$ in 15% RH air at a residence time of 0.16 seconds. The $H_2S$ breakthrough time (to an effluent concentration of 7 mg/m³ $H_2S$) was 23.0 minutes.

The layered bed described above was exposed to 150 mg/m³ diesel fuel vapors in flowing, 80% RH air at a residence time of 0.16 seconds for 45 hours. Upon completion of the exposure, the bed was exposed to air at 15% relative humidity (RH) for 3 hours at a residence time of 0.16 seconds to equilibrate the media within the bed. Following equilibration, the contaminant-exposed bed was exposed to a process stream comprised of 4,000 mg/m³ $H_2S$ in 15% RH air at a residence time of 0.16 seconds. The $H_2S$ breakthrough time decreased to 15.5 minutes. Results corresponding to a bed of AIC-T evaluated at a residence time of 0.21 seconds are shown for comparative purposes (from Example 2).

| Diesel Exposure Duration | $H_2S$ Breakthrough Time AIC-T Bed | $H_2S$ Breakthrough Time Layered Bed |
|---|---|---|
| Unexposed | 26.0 min | 23.0 min |
| 45 hours | 12.0 min | 15.5 min |

The layered bed described previously in this example was exposed to contaminated stream comprised of 150 mg/m³ diesel fuel vapors, 20 ppm $NO_2$ and 10 ppm $SO_2$ in flowing 80% RH air at a residence time of 0.16 seconds for 9 hours. Upon completion of the exposure, the bed was exposed to air at 15% relative humidity (RH) for 3 hours at a residence time of 0.16 seconds to equilibrate the media. Following equilibration, the contaminant-exposed bed was exposed to a process stream comprised of 4,000 mg/m³$H_2S$ in 15% RH air at a residence time of 0.16 seconds. The $H_2S$ breakthrough time decreased to 21 minutes. The exposure was repeated as before using a fresh layered bed for contact times of 18, 27, 36 and 45 hours. Upon completion of each exposure, the $H_2S$ breakthrough curve was again recorded. The table below reports the $H_2S$ breakthrough times as a function of the diesel exposure duration. Results corresponding to a bed of AIC-T evaluated at a residence time of 0.21 seconds are shown for comparative purposes (from Example 1).

| Contaminant Exposure Duration | $H_2S$ Breakthrough Time AIC-T Bed | $H_2S$ Breakthrough Time Layered Bed |
|---|---|---|
| Unexposed | 26.0 min | 23.0 min |
| 9 hours | 25.0 min | 21.0 min |
| 18 hours | 18.0 min | 17.0 min |
| 27 hours | 11.0 min | 14.0 min |
| 36 hours | 6.0 min | 11.0 min |
| 45 hours | 3.0 min | 8.5 min |

Results demonstrate that despite the shorter residence time, the layered bed of the present example provides improved filtration performance following exposure to airborne contaminants.

Example 10: Performance of Layered Bed—DMMP

A layered bed comprised of 33% by volume 16×30 mesh Co-ZZAT (zirconium hydroxide loaded with 17% Zn, 3% Co, and 0.3% Ag by weight and impregnated with 6% TEDA by volume) and 67% by volume 12×30 mesh AIC-T was evaluated for its ability to remove DMMP. Co-ZZAT was located at the bed inlet, and AIC-T was located at the bed outlet. The layered bed was evaluated for its ability to remove $H_2S$ from streams of air. The bed was exposed to air at 15% relative humidity (RH) for 1 hour at a residence time of 0.16 seconds to equilibrate the media. Following equilibration, the bed was exposed to a process stream comprised of 3,000 mg/m$^3$ DMMP in 15% RH air at a residence time of 0.16 seconds. The DMMP breakthrough time (to an effluent concentration of 0.25 mg/m$^3$ DMMP) was 100 minutes.

The layered bed described above was exposed to 150 mg/m$^3$ diesel fuel vapors in flowing 80% RH air at a residence time of 0.16 seconds for 9 hours. Upon completion of the exposure, the bed was exposed to air at 15% relative humidity (RH) for 3 hours at a residence time of 0.16 seconds to equilibrate the media within the bed. Following equilibration, the diesel-exposed bed was exposed to a process stream comprised of 3,000 mg/m$^3$ DMMP in 15% RH air at a residence time of 0.16 seconds. The DMMP breakthrough time decreased to 60 minutes. The diesel exposure was repeated as before using a fresh bed for contact times of 18, 27, 36 and 45 hours. Upon completion of each diesel exposure, the DMMP breakthrough curve was again recorded. The table below reports the DMMP breakthrough times as a function of the diesel exposure duration. Results corresponding to a bed of AIC-T evaluated at a residence time of 0.21 seconds are shown for comparative purposes (from Example 3).

| Diesel Exposure Duration | DMMP Breakthrough Time AIC-T Bed | DMMP Breakthrough Time Layered Bed |
| --- | --- | --- |
| Unexposed | 160 min | 100 min |
| 9 hours | 125 min | 60 min |
| 18 hours | 103 min | 49 min |
| 27 hours | 60 min | 43 min |
| 36 hours | 52 min | 43 min |
| 45 hours | 34 min | 40 min |

The layered bed described previously in this example was exposed to contaminated stream comprised of 150 mg/m$^3$ diesel fuel vapors, 20 ppm $NO_2$ and 10 ppm $SO_2$ in flowing, 80% RH air at a residence time of 0.16 seconds for 9 hours. Upon completion of the exposure, the bed was exposed to air at 15% relative humidity (RH) for 3 hours at a residence time of 0.16 seconds to equilibrate the media. Following equilibration, the bed was exposed to a process stream comprised of 3,000 mg/m$^3$ DMMP in 15% RH air at a residence time of 0.16 seconds. The DMMP breakthrough time decreased to 66 minutes. The exposure was repeated as before using a fresh layered bed for contact times of 18, 27, 36 and 45 hours. Upon completion of each exposure, the DMMP breakthrough curve was again recorded. The table below reports the DMMP breakthrough time as a function of the diesel exposure duration. Results corresponding to a bed of AIC-T evaluated at a residence time of 0.21 seconds are shown for comparative purposes (from Example 3).

| Contaminant Exposure Duration | DMMP Breakthrough Time AIC-T Bed | DMMP Breakthrough Time Layered Bed |
| --- | --- | --- |
| Unexposed | 160 min | 100 min |
| 9 hours | 116 min | 66 min |
| 18 hours | 94 min | 49 min |
| 27 hours | 63 min | 43 min |
| 36 hours | 52 min | 40 min |
| 45 hours | 32 min | 37 min |

Although the layered bed provides a lower initial DMMP protection capability, following an extensive exposure to airborne contaminants, the performance of the layered bed is consistent with that of the AIC-T bed, despite being operated at a shorter residence time.

Example 11: Performance of Layered Bed—HCN

A layered bed comprised of 33% by volume 16×30 mesh Co-ZZAT (zirconium hydroxide loaded with 17% Zn, 3% Co, and 0.3% Ag by weight and impregnated with 6% TEDA by weight) and 67% by volume 12×30 mesh AIC-T was evaluated for its ability to remove HCN. Co-ZZAT was located at the bed inlet, and AIC-T was located at the bed outlet. The layered bed was evaluated for its ability to remove HCN from streams of air. The bed was exposed to air at 80% relative humidity (RH) for 1 hour at a residence time of 0.16 seconds to equilibrate the media. Following equilibration, the bed was exposed to a process stream comprised of 4,000 mg/m$^3$ HCN in 80% RH air at a residence time of 0.16 seconds. The HCN breakthrough time (to an effluent concentration of 8 mg/m$^3$ HCN) was 18.0 minutes.

The layered bed described previously in this example was exposed to contaminated stream comprised of 150 mg/m$^3$ diesel fuel vapors, 20 ppm $NO_2$ and 10 ppm $SO_2$ in flowing, 80% RH air at a residence time of 0.16 seconds for 45 hours. Upon completion of the exposure, the bed was exposed to air at 80% relative humidity (RH) for 3 hours at a residence time of 0.16 seconds to equilibrate the media. Following equilibration, the contaminant-exposed bed was exposed to a process stream comprised of 4,000 mg/m$^3$ HCN in 80% RH air at a residence time of 0.16 seconds. The HCN breakthrough time decreased to 7.5 minutes.

| Contaminant Exposure Duration | $H_2S$ Breakthrough Time AIC-T Bed | $H_2S$ Breakthrough Time Layered Bed |
| --- | --- | --- |
| Unexposed | 16.5 min | 18.0 min |
| 45 hours | Less than 2.0 min | 7.5 min |

Results demonstrate that despite the shorter residence time, the layered bed of the present example provides improved filtration performance both initially and following exposure to airborne contaminants.

Example 12: Performance of Layered Bed—$NO_2$

A layered bed comprised of 27% by volume 16×30 mesh Co-ZZAT (zirconium hydroxide loaded with 17% Zn, 3% Co, and 0.3% Ag by weight and impregnated with 6% TEDA by weight) and 73% by volume 12×30 mesh AIC-T was evaluated for its ability to remove $NO_2$. Co-ZZAT was located at the bed inlet, and AIC-T was located at the bed outlet. The layered bed was evaluated for its ability to remove $NO_2$ from streams of air. The bed was exposed to air at 80% relative humidity (RH) for 3 hours at a residence time of 0.16 seconds to equilibrate the media. Following equilibration, the bed was exposed to a process stream comprised of 375 mg/m$^3$ NO$_2$ in 80% RH air at a residence time of 0.16 seconds. Breakthrough occurred as NO, rather than NO$_2$. The NO breakthrough time (to an effluent concentration of 25 mg/m$^3$ NO) was 80 minutes, significantly greater than the 2 minute breakthrough time as reported in Example 5.

Example 13: Performance of Layered Bed—NH$_3$

A layered bed comprised of 27% by volume 16×30 mesh Co-ZZAT (zirconium hydroxide loaded with 17% Zn, 3% Co, and 0.3% Ag by weight and impregnated with 6% TEDA by weight) and 73% by volume 12×30 mesh AIC-T was evaluated for its ability to remove NH$_3$. Co-ZZAT was located at the bed inlet, and AIC-T was located at the bed outlet. The layered bed was evaluated for its ability to remove NH$_3$ from streams of air. The bed was exposed to air at 15% relative humidity (RH) for 1 hour at a residence time of 0.16 seconds to equilibrate the media. Following equilibration, the bed was exposed to a process stream comprised of 1,000 mg/m$^3$ NH$_3$ in 15% RH air at a residence time of 0.16 seconds. The NH$_3$ breakthrough time (to an effluent concentration of 35 mg/m$^3$ NH$_3$) was 12 minutes.

Example 14: Performance of Layered Bed—CH$_2$O

A layered bed comprised of 27% by volume 16×30 mesh Co-ZZAT (zirconium hydroxide loaded with 17% Zn, 3% Co, and 0.3% Ag by weight and impregnated with 6% TEDA by weight) and 73% by volume 12×30 mesh AIC-T was evaluated for its ability to remove formaldehyde (CH$_2$O). Co-ZZAT was located at the bed inlet, and AIC-T was located at the bed outlet. The layered bed was exposed to air at 15% relative humidity (RH) for 3 hours at a residence time of 0.16 seconds to equilibrate the media. Following equilibration, the layered bed was exposed to a process stream comprised of 1,200 mg/m$^3$ CH$_2$O in 15% RH air at a residence time of 0.16 seconds. The CH$_2$O breakthrough time (to an effluent concentration of 1.5 mg/m$^3$) was 38 minutes.

Results demonstrate that the layered bed is able to effectively filter formaldehyde.

Example 15: Water Saturation Effects—SO$_2$

Filter beds were saturated with water to simulate the effects of moisture, such as dew, rain, etc., contacting the filter bed. An activated carbon impregnated with 4% Cu, 4% Zn, 2% Mo, and 0.05% Ag by weight and 3% triethylene diamine (TEDA) by weight was obtained from a commercial vendor as 12×30 mesh granules. The material is referred to as AIC-T. A bed of AIC-T was saturated with DI water to incipient wetness, then allowed to stand for 72 hours. Upon completion, the bed was exposed to 15% RH flowing air at a residence time of 0.21 seconds for 16 hours to dry and equilibrate the bed. Upon completion, the AIC-T bed was exposed to a process stream comprised of 4,000 mg/m$^3$ SO$_2$ in 15% RH air at a residence time of 0.21 seconds. The SO$_2$ breakthrough time (to an effluent concentration of 9 mg/m$^3$ SO$_2$) was 9.0 minutes.

A layered bed comprised of 33% by volume 16×30 mesh Co-ZZAT (zirconium hydroxide loaded with 17% Zn, 3% Co, and 0.3% Ag by weight and impregnated with 6% TEDA by weight) and 67% by volume 12×30 mesh AIC-T was prepared for testing. Co-ZZAT was located at the bed inlet, and AIC-T was located at the bed outlet. The bed was saturated with DI water to incipient wetness, then allowed to stand for 72 hours. Upon completion, the bed was exposed to 15% RH flowing air at a residence time of 0.21 seconds for 16 hours to dry and equilibrate the bed. Upon completion, the layered bed was exposed to a process stream comprised of 4,000 mg/m$^3$ SO$_2$ in 15% RH air at a residence time of 0.21 seconds. The SO$_2$ breakthrough time (to an effluent concentration of 9 mg/m$^3$ SO$_2$) was 15.5 minutes.

| Bed Condition | SO$_2$ Breakthrough Time AIC-T Bed | SO$_2$ Breakthrough Time Layered Bed |
| --- | --- | --- |
| As-prepared | 19.5 min | 22.5 min |
| Water Saturated | 10.0 min | 15.5 min |

Example 16: Water Saturation Effects—H$_2$S

Filter beds were saturated with water to simulate the effects of moisture, such as dew, rain, etc., contacting the filter bed. An activated carbon impregnated with 4% Cu, 4% Zn, 2% Mo, and 0.05% Ag by weight and 3% triethylene diamine (TEDA) by weight was obtained from a commercial vendor as 12×30 mesh granules. The material is referred to as AIC-T. A bed of AIC-T was saturated with DI water to incipient wetness, then allowed to stand for 72 hours. Upon completion, the bed was exposed to 15% RH flowing air at a residence time of 0.21 seconds for 16 hours to dry and equilibrate the bed. Upon completion, the AIC-T bed was exposed to a process stream comprised of 4,000 mg/m$^3$ H$_2$S in 15% RH air at a residence time of 0.21 seconds. The H$_2$S breakthrough time (to an effluent concentration of 7 mg/m$^3$ H$_2$S) was 9.0 minutes.

A layered bed comprised of 33% by volume 16×30 mesh Co-ZZAT (zirconium hydroxide loaded with 17% Zn, 3% Co, and 0.3% Ag by weight and impregnated with 6% TEDA by weight) and 67% by volume 12×30 mesh AIC-T was prepared for testing. Co-ZZAT was located at the bed inlet, and AIC-T was located at the bed outlet. The bed was saturated with DI water to incipient wetness, then allowed to stand for 72 hours. Upon completion, the bed was exposed to 15% RH flowing air at a residence time of 0.21 seconds for 16 hours to dry and equilibrate the bed. Upon completion, the layered bed was exposed to a process stream comprised of 4,000 mg/m$^3$ H$_2$S in 15% RH air at a residence time of 0.21 seconds. The H$_2$S breakthrough time (to an effluent concentration of 9 mg/m$^3$ H$_2$S) was 13.5 minutes.

| Bed Condition | H$_2$S Breakthrough Time AIC-T Bed | H$_2$S Breakthrough Time Layered Bed |
| --- | --- | --- |
| As-prepared | 26.0 min | 23.0 min |
| Water Saturated | 9.0 min | 13.5 min |

Example 17: Performance of Tri-Layered Bed—NH$_3$

A tri-layered bed comprised of 20% by volume 16×30 mesh Co-ZZAT (zirconium hydroxide loaded with 17% Zn, 3% Co, 0.3% Ag by weight and impregnated with 6% TEDA by weight), 60% by volume 12×30 mesh AIC-T and 20% by volume 16×30 mesh activated carbon impregnated with 15% zinc chloride by weight was evaluated for its ability to remove NH$_3$. Co-ZZAT was located at the bed inlet, and AIC-T was located at the bed outlet. The layered bed was evaluated for its ability to remove NH$_3$ from streams of air. The bed was exposed to air at 15% relative humidity (RH) for 1 hour at a residence time of 0.21 seconds to equilibrate the media. Following equilibration, the bed was exposed to a process stream comprised of 1,000 mg/m$^3$ NH$_3$ in 15% RH air at a residence time of 0.21 seconds. The NH$_3$ breakthrough time (to an effluent concentration of 35 mg/m$^3$ NH$_3$) was 22 minutes.

A tri-layered bed comprised of 20% by volume 16×30 mesh Co-ZZAT (zirconium hydroxide loaded with 17% Zn, 3% Co, 0.3% Ag by weight and impregnated with 6% TEDA by weight), 60% by volume 12×30 mesh AIC-T and 20% by volume 16×30 mesh zirconium hydroxide impregnated with 40% zinc chloride by weight was evaluated for its ability to remove NH$_3$. Co-ZZAT was located at the bed inlet, and AIC-T was located at the bed outlet. The layered bed was evaluated for its ability to remove NH$_3$ from streams of air. The bed was exposed to air at 15% relative humidity (RH) for 1 hour at a residence time of 0.21 seconds to equilibrate the media. Following equilibration, the bed was exposed to a process stream comprised of 1,000 mg/m$^3$ NH$_3$ in 15% RH air at a residence time of 0.21 seconds. The NH$_3$ breakthrough time (to an effluent concentration of 35 mg/m$^3$ NH$_3$) was 34 minutes.

Results demonstrate that adding a layer of ammonia removal material at the outlet of the bed yields greatly improves the NH$_3$ removal capability.

Example 18: Radial Flow Filter—SO$_2$

A radial flow filter was prepared using Co-ZZAT and AIC-T immobilized in polyester webbing. The outside diameter of the filter was 20.5 inches and the inside diameter of the filter was 11.9 inches. The filter was 10.2 inches long. The filter contained 12.7 lbs of Co-ZZAT and 13.8 lbs of AIC-T carbon. The webbing used in the manufacture of the filter contained 110 g/ft$^2$ Co-ZZAT and 70 g/ft$^2$ AIC-T carbon. The filter was challenged with 200 scfm of air with a RH of 15% for approximately 1 hour in order to equilibrate the filter. The pressure drop through the filter was 4.5 inches of water. Following equilibration, the filter was exposed to a process stream comprised of 1,000 mg/m$^3$ SO$_2$ in 15% RH air at a flow rate of 200 SCFM. The SO$_2$ breakthrough time (to an effluent concentration of 9 mg/m$^3$ SO$_2$) was 82 minutes.

Example 19: Radial Flow Filter—DMMP

A radial flow filter was prepared using Co-ZZAT and AIC-T immobilized in polyester webbing. The outside diameter of the filter was 20.5 inches and the inside diameter of the filter was 11.9 inches. The filter was 10.2 inches long. The filter contained 7.9 lbs of Co-ZZAT and 15.8 lbs of AIC-T carbon. The webbing used in the manufacture of the filter contained 110 g/ft$^2$ Co-ZZAT and 70 g/ft$^2$ AIC-T carbon. The filter was challenged with 200 scfm of air with a RH of 15% for approximately 1 hour in order to equilibrate the filter. The pressure drop through the filter was 4.5 inches of water. Following equilibration, the filter was exposed to a process stream comprised of 3,000 mg/m$^3$ DMMP in 15% RH air at a flow rate of 200 SCFM. The DMMP breakthrough time (to an effluent concentration of 0.25 mg/m$^3$ DMMP) was 60 minutes.

We claim:

1. A process for filtering undesired chemicals in a stream of contaminated air for supply to a confined area, the process comprising
    (1) contacting the air with a filter, the filter comprising by volume from about 5% to about 95% triethylene diamine impregnated zirconium hydroxide, from about 5% to about 95% activated impregnated carbon, and optionally, up to about 50% ammonia removal material; and
    (2) supplying the contacted air to the confined area.

2. A process according to claim 1, wherein the air is humid air.

3. A process according to claim 1, wherein the chemicals are selected from the group consisting of SO$_2$, DMMP, HCN, NH$_3$, NO$_2$, CH$_2$O and H$_2$S.

4. A process according to claim 1, wherein the step of contacting the air with a filter comprises contacting the air with a radial flow filter.

5. A process according to claim 1, wherein the contacting step comprises contacting the air with a filter bed comprising an inlet layer of zirconium hydroxide, an outlet layer of activated impregnated carbon, and optionally a middle layer of ammonia removal material.

6. A process according to claim 1, wherein the zirconium hydroxide is further impregnated with Zn, Co, and Ag.

7. A process according to claim 1, wherein the zirconium hydroxide is impregnated with about 6% by weight triethylene diamine.

8. A process according to claim 1, wherein the zirconium hydroxide is loaded with about 17% Zn, about 3% Co, and about 0.3% Ag by weight.

9. A process according to claim 1, wherein the zirconium hydroxide is loaded with about 17% Zn, about 3% Co, 0.3% Ag and about 6% triethylene diamine by weight.

10. A process according to claim 1, wherein the zirconium hydroxide is impregnated with oxides, hydroxides, carbonates or ammonium complexes of a metal selected from the group consisting of vanadium, chromium, manganese, iron, cobalt, nickel, copper, zinc, molybdenum, tungsten, silver, and gold.

11. A process according to claim 1, wherein the activated carbon is impregnated with triethylene diamine.

12. A process according to claim 1, wherein the activated carbon is impregnated with about 4% Cu, about 4% Zn, about 2% Mo, about 0.05% Ag and about 3% triethylene diamine by weight.

13. A process according to claim 1, wherein the activated carbon is impregnated with oxides, hydroxides, carbonates or ammonium complexes of a metal selected from the group consisting of vanadium, chromium, manganese, iron, cobalt, nickel, copper, zinc, molybdenum, tungsten, silver and gold.

14. A process according to claim 1, wherein the zirconium hydroxide is loaded with about 17% Zn, about 3% Co, 0.3% Ag and about 6% triethylene diamine by volume, and the activated carbon is impregnated with about 4% Cu, about 4% Zn, about 2% Mo, about 0.05% Ag and about 3% triethylene diamine by weight.

15. A process according to claim 1 comprising ammonia removal material, wherein the ammonia removal material is impregnated with an acid.

16. A process according to claim 15, wherein the acid is selected from the group consisting of HCl, H$_2$SO$_4$, citric acid, and formic acid.

17. A process according to claim 1, wherein the ammonia removal material comprises a porous substrate selected from the group of substrates consisting of activated carbon, aluminum oxide, aluminum hydroxide, titanium dioxide, zirconium oxide and zirconium hydroxide.

18. A process according to claim 1 comprising ammonia removal material, wherein the ammonia removal material comprises a porous substrate impregnated with one of the group consisting of chlorides, sulfates and nitrates of a metal selected from the group of metals consisting of iron, zinc, copper and nickel.

19. A process according to claim 1, wherein the chemicals are selected from the group consisting of chlorine gas, phosgene, cyanogen chloride, mustard (bis(2-chloroethyl) sulfide, sarin and O-ethyl S-[2-(diisopropylamino)ethyl] methylphosphonothioate.

20. A process according to claim 2, wherein the humid air contacted with the filter has a relative humidity of at least about 15%.

21. A process according to claim 1 comprising ammonia removal material, wherein the ammonia removal comprises activated carbon impregnated with zinc chloride.

22. A process according to claim 1, wherein the contacting step comprises contacting the air with the filter having a zirconium hydroxide inlet.

23. A process according to claim 1, wherein the contacting step comprises contacting the air with the filter having an activated impregnated carbon outlet.

24. A process according to claim 1, wherein the contacting step comprises contacting the air with the filter having an ammonia removal material located between a zirconium hydroxide filter inlet and an activated impregnated carbon outlet layer.

25. A process according to claim 1, wherein the contacting the air with the filter step comprises a filter having a zirconium hydroxide inlet layer, an ammonia removal material middle layer comprising a substrate impregnated with an acid, and an activated impregnated carbon outlet layer.

26. A process according to claim 1, wherein the filter is integrated into a HEPA filter.

27. A process according to claim 1, wherein the filter is a radial flow filter wherein the impregnated zirconium hydroxide and the impregnated activated carbon are immobilized in webbing.

28. A process according to claim 1, wherein the filter comprises a filter bed.

29. A process according to claim 4, wherein the radial flow filter comprises a media-loaded polymeric webbing.

30. A process for filtering undesired chemicals in a stream of contaminated humid air for supply to a confined area, the process comprising
contacting the air with a radial flow filter before supplying the air to the confined area, the radial flow filter comprising
from about 5% up to about 48% by volume impregnated zirconium hydroxide, the zirconium hydroxide impregnated with zinc and triethylene diamine, and
from about 5% up to about 67% by volume impregnated activated carbon, the activated carbon impregnated with zinc and triethylene diamine,
wherein both the zirconium hydroxide and the activated carbon are immobilized in a polymeric webbing of the radial flow filter.

31. A process according to claim 30, wherein the zirconium hydroxide is further impregnated with Co and Ag.

32. A process according to claim 30, wherein the activated carbon is further impregnated with Cu and Mo.

33. A process according to claim 30, wherein the zirconium hydroxide and the activated carbon are impregnated with about 6% and about 3% by weight triethylene diamine, respectively.

34. A process according to claim 30, wherein the activated carbon is further impregnated with Ag.

35. A process according to claim 30, wherein the zirconium hydroxide is impregnated with about 17% Zn, about 3% Co, about 13% Ag, and about 6% triethylene diamine by weight, and the activated carbon is impregnated with about 4% Cu, about 4% Zn, about 2% Mo, and about 3% triethylene diamine by weight.

36. A process according to claim 30, wherein the zirconium hydroxide is impregnated with about 6% by weight triethylene diamine, and the activated carbon is impregnated with about 3% by weight triethylene diamine.

37. A process according to claim 30, wherein the humid air has a relative humidity of at least about 15%.

38. A process according to claim 30, wherein the chemicals are selected from the group of chemicals consisting of $SO_2$, DMMP, HCN, $NH_3$, $NO_2$, $CH_2O$ and $H_2S$.

39. A process of claim 30, wherein the filter comprises about 33% impregnated zirconium hydroxide and about 67% impregnated activated carbon by volume.

40. A process of claim 30, wherein the filter comprises about 48% impregnated zirconium hydroxide and about 52% impregnated activated carbon by volume.

41. A process for the filtering undesired chemicals in a stream of contaminated humid air before being supplied to a confined area, the process comprising
(1) contacting the air with a layered filter bed having an inlet layer, the inlet layer comprising zirconium hydroxide impregnated with zinc,
(2) contacting the air with a middle layer of the layered filter bed comprising a substrate impregnated with an acid, and
(3) contacting the air with an outlet layer of the layered filter bed, the outlet layer comprising activated carbon impregnated with triethylene diamine,
(4) supplying the contacted air to the confined area,
wherein the bed is comprised of about 20% by volume inlet layer, about 20% by volume middle layer, and about 60% by volume outlet layer.

42. A process according to claim 41, wherein the air is humid.

43. A process according to claim 41, wherein the undesired chemicals are selected from the group consisting of $SO_2$, DMMP, HCN, $NH_3$, $NO_2$, $CH_2O$ and $H_2S$.

44. A process according to claim 41, wherein the layer of impregnated zirconium hydroxide is loaded with about 17% Zn, about 3% Co, about 0.3% Ag and about 6% triethylene diamine by weight.

45. A process according to claim 41, wherein the layer of zirconium hydroxide is further impregnated with Ag.

46. A process according to claim 41, wherein the layer of zirconium hydroxide is further impregnated with Co.

47. A process according to claim 41, wherein the layer of zirconium hydroxide is further impregnated with triethylene diamine.

48. A process according to claim 41, wherein the layer of impregnated zirconium hydroxide is loaded with Co, Ag, and triethylene diamine.

49. A process according to claim 41, wherein the layer of impregnated zirconium hydroxide is loaded with about 17% Zn and about 3% Co by weight.

50. A process according to claim 41, wherein the layer of zirconium hydroxide is impregnated with oxides, hydroxides, carbonates or ammonium complexes of a metal selected from the group consisting of vanadium, chromium, manganese, iron, cobalt, nickel, copper, zinc, molybdenum, tungsten, silver, and gold.

51. A process according to claim 41, wherein the layer of carbon is impregnated with at least two of Cu, Zn, Mo, and Ag.

52. A process according to claim 41, wherein the layer of activated carbon is impregnated with about 4% Cu, about 4% Zn, about 2% Mo, and about 3% triethylene diamine by weight.

53. A process according to claim 41, wherein the layer of activated carbon is impregnated with oxides, hydroxides, carbonates or ammonium complexes of a metal selected from the group consisting of vanadium, chromium, manganese, iron, cobalt, nickel, copper, zinc, molybdenum, tungsten, silver and gold.

54. A process according to claim 41, wherein the layer of carbon is further impregnated with silver, gold and mixtures thereof.

55. A process according to claim 41, wherein the middle layer comprises a porous substrate impregnated with an acid selected from the group of acids consisting of HCl, $H_2SO_4$, citric acid, and formic acid.

56. A process according to claim 41, wherein the middle layer comprises a porous substrate impregnated with an acid selected from the group consisting of HCl, $H_2SO_4$, citric acid, and formic acid.

57. A process according to claim 41, wherein the middle layer comprises a porous substrate selected from the group of substrates consisting of activated carbon, aluminum oxide, aluminum hydroxide, titanium dioxide, zirconium oxide and zirconium hydroxide.

58. A process according to claim 41, wherein the middle layer comprises a porous substrate impregnated with one of the group consisting of chlorides, sulfates and nitrates of a metal selected from the group of metals consisting of iron, zinc, copper and nickel.

59. A process according to claim 41, wherein the chemicals are selected from the group consisting of chlorine gas, phosgene, cyanogen chloride, mustard (bis (2-chloroethyl) sulfide, sarin and O-ethyl S-[2-(diisopropylamino)ethyl] methylphosphonothioate.

60. A process according to claim 42, wherein the humid air contacted with the filter has a relative humidity of at least about 15%.

61. A process according to claim 41, wherein the contacting step comprises contacting the air with the filter, wherein the middle layer of the filter comprises an ammonia removal material.

62. A process according to claim 41, wherein the filter is integrated into a HEPA filter.

63. A process according to claim 41, wherein the impregnated zirconium hydroxide, the substrate impregnated with acid, and the impregnated activated carbon are immobilized in a polymeric webbing.

* * * * *